June 6, 1961            A. N. ORMOND            2,986,931

STRAIN GAUGE LOAD CELL

Filed Aug. 8, 1958

INVENTOR.
ALFRED N. ORMOND
BY *Elliott & Pastoriza*
ATTORNEYS

United States Patent Office 2,986,931
Patented June 6, 1961

2,986,931
STRAIN GAUGE LOAD CELL
Alfred N. Ormond, P.O. Box 238, Inglewood, Calif.
Filed Aug. 8, 1958, Ser. No. 754,060
5 Claims. (Cl. 73—141)

This invention relates generally to devices for measuring loads and more particularly to an improved strain gauge cell employing elements in bending.

One of the more useful prior art devices for measuring loads or forces is the load ring which is not only simple but extremely versatile in adaptation, portable in use, extremely rugged, and relatively accurate. The load ring basically comprises a circular ring of high quality metal to which loads or forces to be measured are applied at diametrically opposite ends to distort the ring into an elliptical shape. The distortion is always well within the elastic limit of the ring and its degree serves as an indication of the applied load.

There are many different ways in which the actual distortion of the ring can be measured. Preferably, suitable strain gauges are employed on certain portions of the ring to provide an electrical signal which is substantially proportional to the distortion of the ring and thus proportional to the applied load. One of the measures of the excellent of a load ring is its linearity; that is, the degree to which the resulting signal maintains a direct proportional relationship to the applied load. Among the various factor affecting linearity are extraneous stresses and strains established in the load ring as a consequence of extraneous shear forces and torques. These latter forces introduce non-linearities in the system with respect to the applied forces which it is desired to measure.

With the foregoing in mind, it is a primary object of the present invention to provide a novel load cell useful in all applications in which load rings have heretofore been employed, and which is designed in such a manner that stresses and strains in the cell itself as a consequence of extraneous shear forces and torque moments are substantially canceled to the end that greatly increased linearity between the applied load and the output signal is provided.

Other important objects of this invention are to provide a novel load cell design meeting the foregoing object which is lighter in weight, capable of accommodating greater load ranges and is of greater sensitivity than presently known load rings of equal strength and weight whereby increased accuracy of measurement is realizable.

These and many other objetcs and advantages of the present invention are attained by providing a continuous, closed member of non-circular configuration together with strain gauge means secured to a portion of the member subject to a distortion which is a function of the load applied to the member. Preferably, the non-circular configuration takes the form of a rhombus. In accordance wiith a preferred embodiment of the invention, four strain gauges are provided in pairs secured to opposite sides, respectively, of adjacent arms of the rhombus in positions relatively close to diagonally opposite vertices. The load to be measured is applied to the other pair of diagonally opposite vertices forming the rhombus. By this arrangement, greatly increased linearity between the applied load and the output signal from the strain gauges, as incorporated in a conventional strain gauge bridge, is realized notwithstanding the presence of shear forces and torque moments acting on the structure.

A better understanding of the invention will be had by referring to the accompanying drawings illustrating a preferred embodiment, in which.

Figure 1:
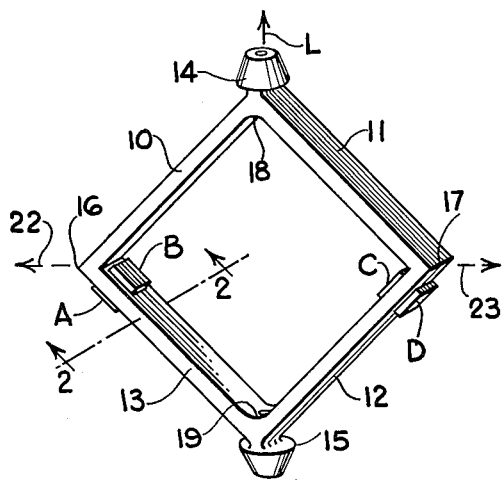
FIGURE 1 is a schematic perspective view of a rhombic shaped load cell incorporating strain gauges in accordance with the invention.

Referring first to FIGURE 1, there is shown a strain gauge load cell comprising first, second, third, and fourth arms designated 10, 11, 12, and 13, respectively, consecutively and integrally connected at their ends to form a continuous closed deformable member in the shape of a rhombus. At the upper and lower diagonal vertices there are provided securing means as indicated at 14 and 15 to which members subject to tension or compression forces to be measured may be attached.

The preferred placement of strain gauges for detecting distortion of the third and fourth arms 12 and 13 of the rhombus is adjacent the diagonally opposite vertices 16 and 17 defined by the connection points of the arms 13 and 10 and the arms 11 and 12. In FIGURE 1, four strain gauges are employed and designated, respectively, by A, B, C, and D. Under tension forces applied to the securing means 14 and 15, as indicated by the arrows L, the strain gauges A and D will be responsive to compression strains while the strain gauges B and C will be responsive to tension strains. In the event of application of a compression force to the securing means 14 and 15, the strain gauges A and B will then measure tension strains while the strain gauges B and C will measure compression strains.

Figure 2:
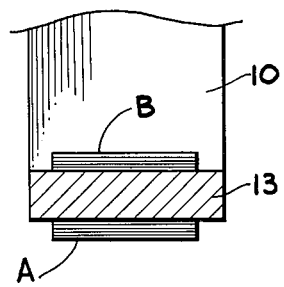
FIGURE 2 is a cross section of one of the arms of the cell taken in the direction of the arrows 2—2 of FIGURE 1.

FIGURE 2 illustrates in greater detail the particular shape of the load cell. Preferably, the arms 10, 11, 12 and 13 are all of substantially equal length to define the rhombus and are integrally formed. As shown in FIGURE 2, each arm is essentially rectangular in cross section, the long dimension of the rectangle serving as a surface to which the strain gauges may be attached such as the strain gauges A and B.

Figure 3:
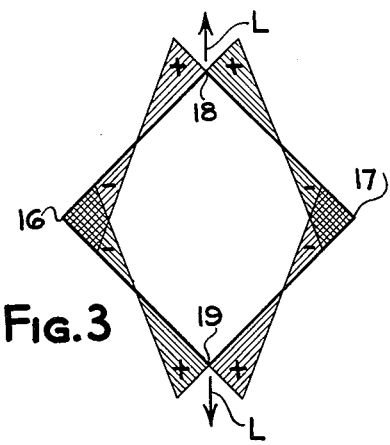
FIGURE 3 is a schematic drawing illustrating by shaded areas in exaggerated graphic form the varying magnitude of strains upon deflection of the arms as a consequence of a rectilinear loading on the cell of FIGURE 1.

Referring now to FIGURE 3, there is illustrated by the shaded areas marked "+" and "—" in exaggerated form the actual strain magnitudes resulting from deflection of the arms as a consequence of a linear tension force applied at the vertices 18 and 19. It will be immediately evident that maximum strain occurs at the various vertices themselves while the midpoints of the arms forming the rhombus exhibit substantially zero strain and thus zero deflection. These midpoints are defined at the intersections of the shaded deflection areas with the arms of the rhombus, in changing from a + to a — value. From FIGURE 3, it will be evident that by attaching the strain gauges as close as possible to the vertices there will result a maximum signal from the gauges themselves.

Because of the possibility of the existence of localized strains and stresses at the points of application of the load as at 14 and 15, it is preferable to attach the strain gauges adjacent the free vertices 16 and 17. By this arrangement, as shown in FIGURE 1, and schematically illustrated in FIGURE 3, the regions of the arms under maximum strains are measured.

Figure 4:
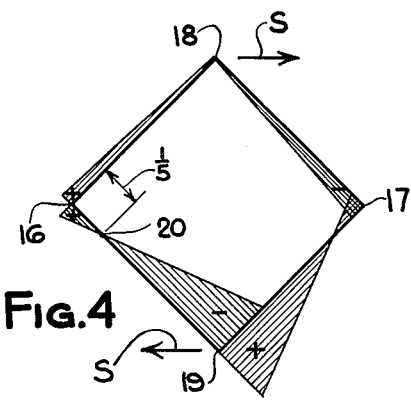
FIGURE 4 is another schematic illustration of the strains in the arms as a consequence of the application of shear forces.

Referring now to FIGURE 4, there is a schematic showing by means of the shaded areas of the strain characteristics established in the rhombus when subjected to shear forces as indicated by the arrows S. It will be immediately evident that adjacent the vertices 16 and 17 these strains are relatively small. In fact, at a point substantially one-fifth of the length of the fourth arm between the vertices 16 and 19, the distortion of the arm as a consequence of the shear forces is zero as indicated at 20. If the strain gauges of FIGURE 1 were thus disposed on opposite sides of the fourth arm 13 at a point substantially one-fifth the length of this arm from the vertex 16, there would be no contribution to the deflection and measured strain from shear forces and thus the linearity with respect to the load force L would in no way be affected in the event shear forces existed.

Figure 5:
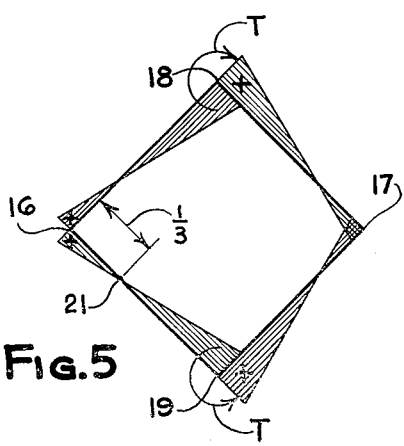
FIGURE 5 is still another schematic representation of strains as a consequence of the application of torque moments.

Referring now to FIGURE 5, there is illustrated the strain characteristics established in the rhombus under the action of torque moments, as indicated by the arrows T. Again, it will be evident that the magnitude of strain in the arms is small at the vertices 16 and 17. In fact, in the absence of other strains, the deflection and thus strain of the fourth arm between the vertices 16 and 19 as a consequence of torque moments is zero at substantially one-third the length of the fourth leg from the vertex 16 as indicated at the point 21. Therefore, if the strain gauges of FIGURE 1 are disposed at substantially one-third the length of the fourth arm from the vertex 16, there will not be detected any extraneous strains as a consequence of torque moments in the measurement of linear forces such as indicated by the arrows L.

When the rhombic load cell is subject to both shear forces and torque moments as is often the case, it is then preferable to dispose the strain gauges between one-fifth and one-third the length of the arm. By this positioning, both the shear forces and torque moments are minimized and yet there is still an appreciable deflection for measurement as a consequence of linear loading.

Because of the fact that the strain due to the linear loading is maximum adjacent the vertices 16 and 17, while the increase in extraneous strains due to shear forces and torque moments is not appreciable, the preferred arrangement in most practical applications would be to dispose the strain gauges less than one-fifth of the length of the arm from the vertices 16 and 17 and preferably as close to these vertices as possible as shown in FIGURE 1.

On the other hand, and as pointed out in the foregoing analysis, if the physical arrangement is such that unexpectedly high shear forces or torque moments may be present, it would be preferable to dispose the gauges between one-fifth and one-third of the distance of the arm from the vertices 16 and 17 whereby deflections as a consequence of the shear forces and torque moments are minimized.

Figure 6:
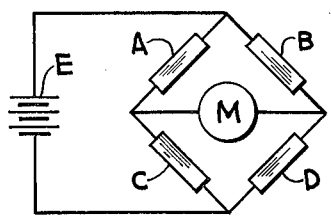
FIGURE 6 is an electrical circuit diagram of a conventional strain gauge bridge.

FIGURE 6 illustrates a conventional strain gauge bridge with the strain gauges A, B, C, and D disposed in the arms of the bridge as shown. The vertices between the junction point of the strain gauges A and B and the junction point of the strain gauges C and D are connected across a battery E to supply a potential to the bridge. By this arrangement, a meter M connected between the junction point of the strain gauges A and C and the junction point of the strain gauges B and D will provide a measurement proportional to the strain in the arms at the points where the strain gauges are attached. This reading will in turn be proportional to the applied loading.

In the operation of the improved strain gauge load cell of this invention, under conditions of no applied forces to the cell the resistances of the strain gauges in the arms of the bridge of FIGURE 6 will all be substantially equal and thus the potential at the vertices across which the meter M is connected will be equal and a zero reading will show on the meter. When a rectilinear tension force is applied between the securing means 14 and 15 as indicated by the arrows L, strain gauges A and D will be subject to compression forces changing their resistance values in one direction while strain gauges B and C will be subject to tension forces changing their resistance values in an opposite direction. As a consequence, the potential at the junction point of gauges A and C will be different from the potential at the junction point of gauges B and D giving rise to a potential difference across the meter proportional to the changes in resistance values. The reading on the meter will be substantially linear with respect to the applied tension load L over a relatively large range. Interference as a consequence of possible shear forces or torque moments will be minimal since these latter extraneous stresses result in minimum deflections of the rhombus arms at the points where the strain gauges are attached as explained fully heretofore. Therefore, greatly improved linearity for the load cell of this invention is achieved as compared to conventional load presently available.

It will be evident that the improved rhombic load cell of this invention is ideally suited for measuring differential loads. For example, if a tension load is also applied to the vertices 16 and 17 of FIGURE 1 as indicated by the dotted arrows 22 and 23, the deflection and strains established in the arms will be exactly opposite to that indicated by the shaded areas in FIGURE 3. Thus, if two tension forces are applied at right angles and are of equal magnitude, any deflection occurring will be equalized over the entire structure and resulting changes in the resistance of the strain gauges will all be equal and in the same direction. As a consequence, a zero reading will result on the meter M of FIGURE 6. On the other hand, if one of the tension forces is greater than the other, the relative deflection occurring in the arms will be substantially proportional to the difference in the two loadings with the result that only the differential forces will be measured. The advantages of minimized deflections as a consequence of shear forces and torque moments still apply when the cell is used as a differential measuring instrument.

While a specific embodiment has been described for illustrative purposes, it will be evident that many modifications that fall within the scope and spirit of this invention will occur to those skilled in the art. The improved strain gauge load cell is, therefore, not to be thought of as limited to the particular embodiment set forth for illustrative purposes.

What is claimed is:

1. A strain gauge load cell comprising, in combination: first, second, third, and fourth load arms of equal length consecutively, integrally connected at their ends to form a deformable member in the shape of a rhombus defining a simple closed curve; said arms being deformable upon application of a first load to diagonally opposite vertices of said rhombus as defined by the connection between said first and second arms and the connection between said third and fourth arms; first and second strain gauges secured respectively to opposite sides of said fourth arm at a given distance from the vertex formed by the connection of said fourth arm to said first arm and third and fourth strain gauges secured respectively to opposite sides of said third arm at a given distance equal to said first mentioned given distance from the vertex formed by the connection of said third arm to said second arm, said given distance being no greater than one-third the length of said fourth arm.

2. The subject matter of claim 1, in which said given distance is substantially equal to one-fifth of the length of said fourth arm whereby minimum distortion of said member as a consequence of shear loads applied to said diagonally opposite vertices is detected.

3. The subject matter of claim 1, in which said given distance is substantially equal to one-third of the length of said fourth arm whereby minimum distortion of said member as a consequence of torque moments applied to said diagonally opposite vertices is detected.

4. The subject matter of claim 1, in which said given distance is between one-fifth and one-third of the length of said fourth arm whereby the total distortion of said member as a consequence of both shear forces and torque moments applied to said diagonally opposite vertices is minimized.

5. A strain gauge load cell comprising, in combination: first, second, third, and fourth load arms of equal length consecutively integrally connected at their ends to form a deformable member in the shape of a rhombus defining a simple closed curve, said arms being deformable upon application of a load to diagonally opposite vertices of said rhombus as defined by the connection between said first and second arms and the connection between said third and fourth arms; and strain gauge means secured to at least one of said arms at a given distance from the vertex formed by the connection of said one arm to the next consecutively connected arm, said given distance being no greater than one-third of the length of said one arm.

References Cited in the file of this patent

UNITED STATES PATENTS

| | | |
|---|---|---|
| 2,520,923 | Franzel et al. | Sept. 5, 1950 |
| 2,569,949 | Prescott | Oct. 2, 1951 |